US012411547B2

(12) United States Patent
Matsui et al.

(10) Patent No.: US 12,411,547 B2
(45) Date of Patent: Sep. 9, 2025

(54) PRESSURE SENSOR DEVICE, METHOD FOR MANUFACTURING THE SAME, AND WORK MANAGEMENT SYSTEM USING THE SAME

(71) Applicant: HITACHI, LTD., Tokyo (JP)

(72) Inventors: Ryohei Matsui, Tokyo (JP); Ryotaro Kawahara, Tokyo (JP); Tetsufumi Kawamura, Tokyo (JP); Nobuyuki Sugii, Tokyo (JP); Naoko Ushio, Tokyo (JP); Hiroyuki Yoshimoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 229 days.

(21) Appl. No.: 17/714,309

(22) Filed: Apr. 6, 2022

(65) Prior Publication Data

US 2022/0342480 A1    Oct. 27, 2022

(30) Foreign Application Priority Data

Apr. 22, 2021  (JP) .................................. 2021-072739

(51) Int. Cl.
  *G06F 3/01*    (2006.01)
  *G01L 1/20*    (2006.01)
  *G01L 1/22*    (2006.01)

(52) U.S. Cl.
  CPC .............. *G06F 3/014* (2013.01); *G01L 1/205* (2013.01); *G01L 1/225* (2013.01)

(58) Field of Classification Search
  CPC ......... G06F 3/014; G01L 1/205; G01L 1/225; G01L 1/18; G01L 5/0028
  See application file for complete search history.

(56) References Cited

U.S. PATENT DOCUMENTS 9,423,309 B2 *   8/2016   Kuniyoshi .............. G01L 1/205
2020/0142561 A1 *  5/2020   Lu ....................... G06F 3/04144
2022/0207978 A1   6/2022   Ishimaru et al.
2024/0169816 A1   5/2024   Ishimaru et al.

FOREIGN PATENT DOCUMENTS

| CN | 106918995 A | * | 7/2017 | ............. G03F 7/031 |
| JP | H04-40333 A |   | 2/1992 | |
| JP | 2005-349493 A |   | 12/2005 | |
| JP | 2007-10383 A |   | 1/2007 | |
| JP | 5969351 B2 | * | 8/2016 | ............... G01L 9/12 |
| JP | 2020-165874 A |   | 10/2020 | |
| JP | 2021-1410 A |   | 1/2021 | |
| WO | WO 2017/166813 A1 | * | 10/2017 | ............. G06F 3/041 |

* cited by examiner

*Primary Examiner* — Tung S Lau
(74) *Attorney, Agent, or Firm* — MATTINGLY & MALUR, PC

(57) ABSTRACT

A pressure sensor device, a method for manufacturing the pressure sensor device, and a work management system mitigating a degree of a false detection is presented. The pressure sensor device detecting pressure includes a flexible substrate base material having flexibility; a comb-teeth shape electrode having an exposed metal surface formed in a predetermined area on the flexible substrate base material; and a pressure-sensitive material that is provided on the comb-teeth shape electrode, varies in a resistance value depending on an amount of a load, and has a curvature in a static state.

11 Claims, 19 Drawing Sheets

$$V = \frac{R_0}{R + R_0} V_0$$

PRESSURE SENSOR DEVICE, METHOD FOR MANUFACTURING THE SAME, AND WORK MANAGEMENT SYSTEM USING THE SAME

CROSS-REFERENCE TO RELATED APPLICATIONS

The present invention relates to and asserts priority from Japanese patent application No. 2021-072739 filed on Apr. 22, 2021, and incorporates the entirety of the contents and subject matter of all the above application herein by reference.

TECHNICAL FIELD

The present invention relates to a pressure sensor device, a method for manufacturing a pressure sensor device, and a management system for work using the pressure sensor device.

BACKGROUND

PTL 1 (Patent Literature 1) describes a sensor that reads a load value using a curvature bias load generated by a piezoelectric sensor being curved when the load is applied. PTL 2 (Patent Literature 2) describes a bridge circuit consisting mainly of four resistors R1 to R4 as pressure-sensitive elements.

CITATION LIST

Patent Literature

[PTL 1] Japanese Patent Publication No. 2020-165874
[PTL 2] Japanese Patent Publication No. 2007-10383

SUMMARY OF THE INVENTION

Technical Problem

Recently, it is expected that a sensor is utilized to digitize a manual work to record a work history, to prevent a work error, and to extract a proficient work skill in assembly process and equipment inspection in a factory. In particular, it is important to sense a pressure caused by a force applied on fingertips in the manual work, and therefore a glove with a built-in pressure sensor is required.

However, when the piezoelectric sensor described in PTL 1 is attached to a glove, bending stress is applied to a pressure-sensitive material, which causes an incorrect response of the sensor.

In the sensor described in PTL 2, a flexible substrate on which the pressure-sensitive element is mounted is affixed to a curved surface, but affixing the flexible substrate to the curved surface generates a curvature bias load, which causes detection sensitivity to be impaired.

Accordingly, it is an object of the present invention to provide a pressure sensor device that is capable of mitigating a degree of a false detection, a method of manufacturing the pressure sensor device, and a management system for a work using the pressure sensor device.

Solution to Problem

The present invention provides a pressure sensor device for detecting pressure, the device comprising a flexible substrate base material having flexibility; a comb-teeth shape electrode having an exposed metal surface and formed in a predetermined area on the flexible substrate base material; and a pressure-sensitive material that is provided on the comb-teeth shape electrode, varies in a resistance value thereof depending on an amount of a load, and has a curvature in a static state.

DESCRIPTION OF EMBODIMENTS

Hereinbelow, an embodiment of the invention is described with reference to the drawings.

Figure 1:
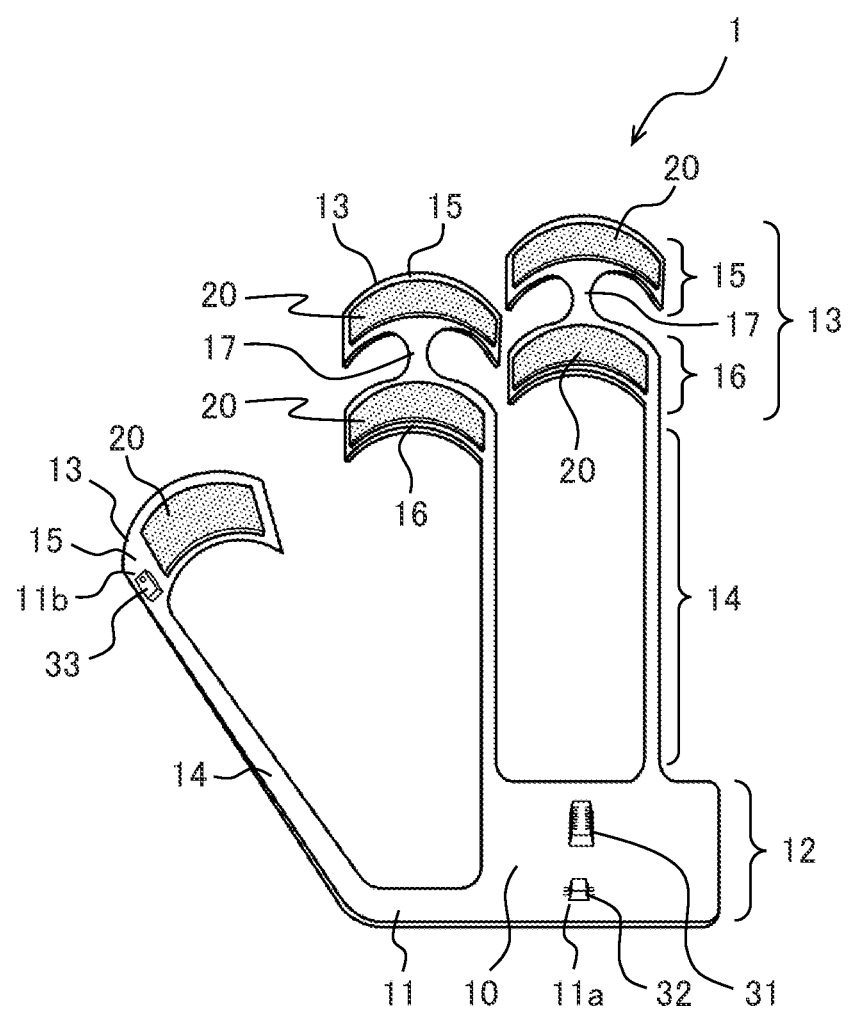
FIG. 1 is a perspective view of a pressure sensor device according to an embodiment.

FIG. 1 is a perspective view of a pressure sensor device according to this embodiment. Note that FIG. 1 shows a state before the device is attached to a glove.

As shown in FIG. 1, a pressure sensor device 1 is configured to include a flexible substrate 10 and a pressure sensor 20 provided on the substrate 10. The pressure sensor device 1 of this embodiment is applied to a right-hand glove and is attached to an inside of the glove to be used. The pressure sensor device 1 may be also applied to a left-hand glove.

The flexible substrate 10 has a shape that follows shapes of three fingers, the thumb, the index finger, and the middle finger. The flexible substrate 10 includes a back part 12 that is assigned to a back of the hand, fingertip parts 13 that are assigned to the fingertips, and a bridge 14 that is placed between the back part 12 and the fingertip parts 13.

Figure 2:
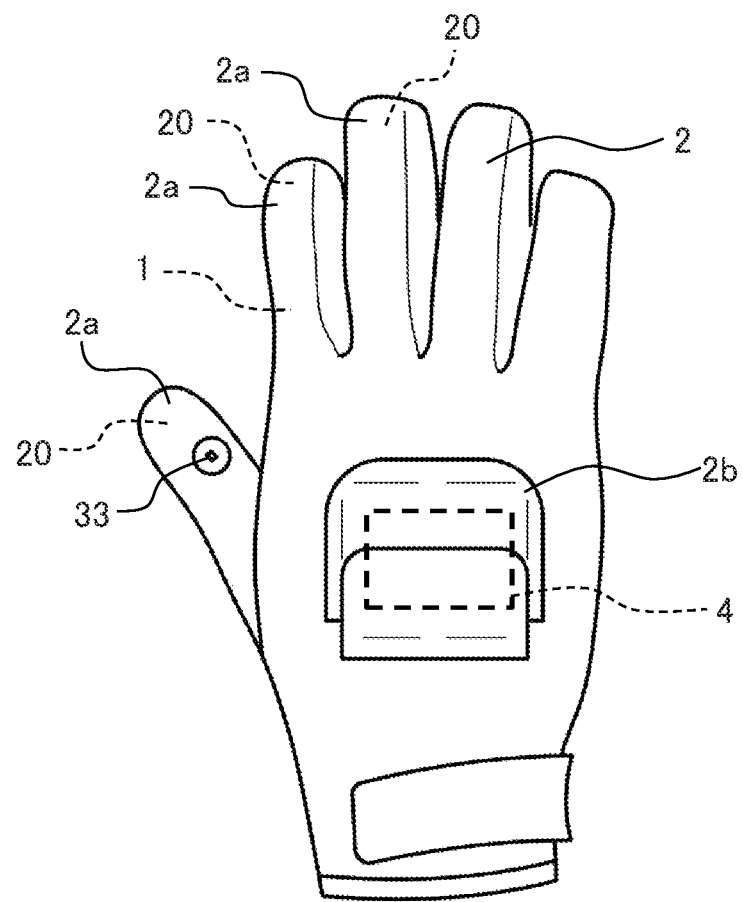
FIG. 2 is an external perspective view of the pressure sensor device attached to a glove.

The back part 12 includes a connector 31 (connection part) that is connected to a wireless transmitter module 4 (see FIG. 2). The back part 12 also includes a connection part 11a connected to an acceleration sensor 32. In addition, the fingertip part 13 for the thumb is equipped with a connection part 11b connecting the back part 12 to a microphone (sound detector) 33 for detecting sound. The bridge 14 is formed to be elongated so that it is placed along sides of the fingers.

The fingertip part 13 for the thumb is provided with a pressure sensor 20 facing a terminal segment 15 of the thumb. The fingertip part 13 for the index finger is provided with pressure sensors 20 facing a terminal segment 15 and a middle segment 16 of the index finger. The fingertip part 13 for the middle finger is provided with pressure sensors facing a terminal segment 15 and a middle segment 16 of the middle finger.

The pressure sensor 20 has a curvature in a static state. In FIG. 1, the pressure sensors 20 for the terminal segment 15 and the middle segment 16 are formed to be curved so that the sensors 20 are convex toward the back of the paper. In other words, the pressure sensors 20 in the static states are configured to be curved in directions that respectively follow bellies of the thumb, index finger, and middle finger in cross sections of their rings cut in round shape. It means that the pressure sensors 20 each has a curvature in a state in which it is left as it is (no external force is applied on it). Note that the curvature may be configured to be curved to have a single semicircle, or may be configured to be curved by combining multiple semicircles.

FIG. 2 is an external perspective view of the pressure sensor device attached to a glove.

As shown in FIG. 2, the pressure sensor device 1 is fixed to the glove 2 in a state in which the glove 2 is turned inside out. It means that the pressure sensor device 1 is fixed to the inside of the glove 2 to be used.

A pocket 2b is provided on the back of the glove 2. This pocket 2b stores a wireless transmitter module 4 (transmitter). The wireless transmitter module 4 is electrically connected via the connector 31 (see FIG. 1) to the pressure sensor 20, the acceleration sensor 32, and a microphone 33 on the flexible substrate 10. The wireless transmitter module 4 is responsible for a function of transmitting detected sensor data via a wireless connection to an edge server 103 (see FIG. 18). Although the pressure sensor device 1 is illustrated as communicating via the wireless connection, a wired connection is also available. Details of a work management system 500 (see FIG. 18) using the pressure sensor device 1 is described below.

The pocket 2b is a so-called lidded pocket, and a lid prevents the wireless transmitter module 4 stored in the pocket 2b (pocket body) from falling out thereof even when the fingertip 2a is turned upward. The lid is not mandatory and may be dispensed with, or a fastener can be attached to close a mouth of the pocket 2b instead of the lid.

The fingertip 2a of the glove 2 is provided inside the glove with an inside pressure sensor 20, which is able to detect a fingertip pressure (load) applied on the fingertip 2a.

The microphone 33 mounted on the flexible substrate 10 is placed so as to be exposed to outside through a hole provided in a portion of the glove 2. This allows sound from outside the glove 2 to be collected. When sound passes through cloth, sound volume is attenuated or high frequency sound is filtered out, which causes degradation of the sound. In this embodiment, the hole provided for the microphone 33 is able to prevent the degradation of the sound.

Figure 3:
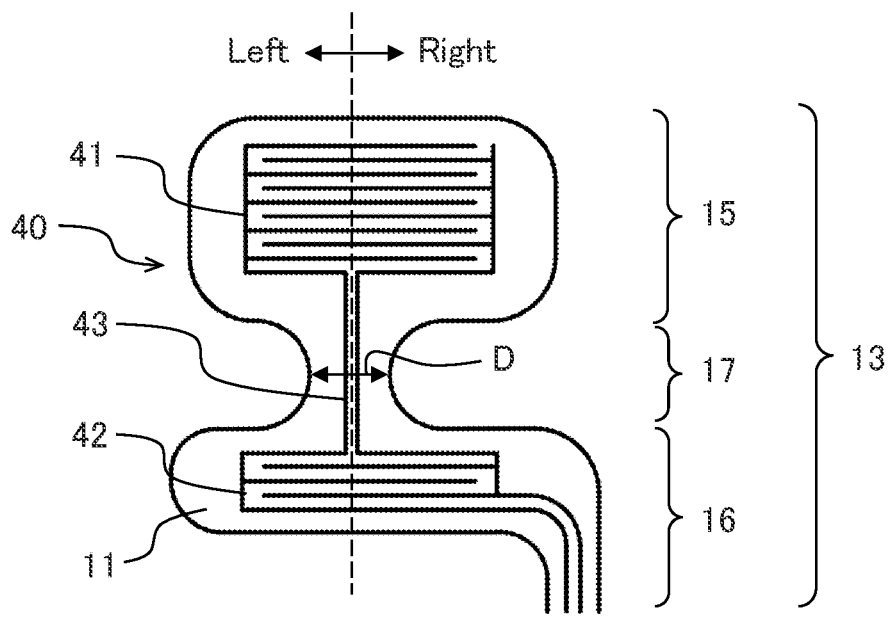
FIG. 3 is a plan view showing a part of a flexible substrate used in the pressure sensor device of the embodiment.

FIG. 3 is a plan view showing a part of the flexible substrate used in the pressure sensor device of the embodiment. Note that FIG. 3 shows a state in which the flexible substrate 10 for the index or middle finger is flattened. FIG. 3 also shows a state without a pressure-sensitive material 21 described below.

As shown in FIG. 3, the flexible substrate 10 includes a flexible substrate base material 11 and an electrode 40 provided on the flexible substrate base material 11. The electrode 40 is provided on a front side relative to the flexible substrate base material 11 as viewed vertically with respect to the paper surface.

The flexible substrate base material 11 is formed in a film-like form using material such as polyimide or polyester and in a rectangular shape so that it is widened in a right-left direction at the terminal segment 15 and middle segment 16 of the index finger (or middle finger).

Figure 8:
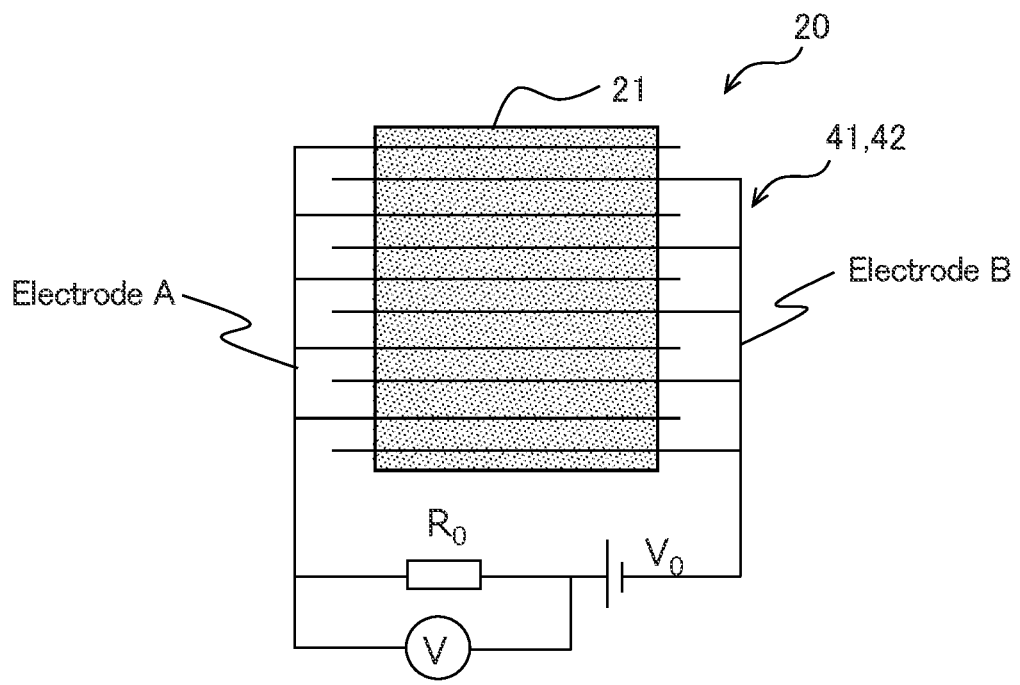
FIG. 8 is a circuit diagram of a reading circuit reading a resistance of a pressure-sensitive material using a comb-teeth shape electrode.

The electrode 40 is composed mainly of comb-teeth shape electrodes 41 and 42 that are pattern-printed with copper or copper foil. The comb-teeth shape electrodes 41 and 42 each is an electrode having a shape in which two electrodes are alternately patterned. In addition, the comb-teeth shape electrodes 41 and 42 are fixed to the flexible substrate base material 11 by attaching them to the material 11 via an adhesive such as epoxy resin. As shown in FIG. 8 below, each of the opposing comb teeth in the comb-teeth shape electrode 41 is configured so that it does not contact the other tooth. This is the same for the comb-teeth shape electrode 42.

The comb-teeth shape electrode 41 is located at a position corresponding to the terminal segment 15. The terminal segment 15 refers to a portion beyond the first joint of the finger. The comb-teeth shape electrode 42 is located at a position corresponding to the middle segment 16. The middle segment 16 refers to a portion between the first and second joints of the finger. Note that there is provided with a comb-teeth shape electrode at a position of the flexible substrate base material 11 corresponding to the terminal segment of the thumb.

The flexible substrate base material 11 is provided with a neck portion (necked shape) 17 formed between the positions corresponding to the terminal segment 15 and the middle segment 16, at which neck portion the flexible substrate base material 11 is formed to be narrowed. The neck portion 17 is provided with a connection electrode 43 in a shape of a straight line that electrically connects the comb-teeth shape electrode 41 to the comb-teeth shape electrode 42. In addition, the neck portion 17 is formed to be narrower than a portion of the flexible substrate base material 11 at a position corresponding to the terminal segment 15 and the middle segment 16. The comb-teeth shape electrode 41 is formed to be longer than the comb-teeth shape electrode 42 in a direction of extending the finger. The comb-teeth shape electrode 41 is formed to have the same length as the comb-teeth shape electrode 42 in the width direction.

The flexible substrate base material 11 is formed asymmetrically with reference to the connection electrode (connection wiring) 43. The comb-teeth shape electrodes 41 and 42 are also formed right-left asymmetrically with reference to the position of the connection electrode 43. In this embodiment, the comb-teeth shape electrode on the left is configured to be larger in its electrode area than the comb-teeth shape electrode on the right.

By the way, the connection electrode 43 may be assigned along a side of a finger like the bridge 14, but assigning the electrode 43 along a belly of the finger is found to cause less uncomfortableness when the finger is bent. The strength of the neck portion 17 is important because the first joint of the finger is bent repeatedly at a high frequency while a worker is performing a manual work. The width D of the neck portion 17 is determined by a trade-off between tensile strength and wearing comfortableness. The width D of the neck portion 17 is preferably 6.25 mm or more and 8.65 mm or less on a basis of statistics of sizes of Japanese fingers. The following is an explanation of how to obtain the width D.

According to publication data, "Data of Japanese Hand Dimensions (AIST: Agency of Industrial Science and Technology, URL: https://www.airc.aist.go.jp/dhrt/hand/data/list.html), the width of the first joint of the index finger: d that is measured in 327 males and 203 females is 14.9 mm in a mean value $\mu$ and 1.2 mm in a standard deviation $\sigma$. The width D of the neck portion 17 should be about half the width of the finger based on the trade-off between the tensile strength and the wearing comfortableness. To make width D match the $2a$ interval of the Japanese distribution, the width D of the neck portion 17 should be determined by the following conditional equation:

$$(\mu-2\sigma)/2<D<(\mu+2\sigma)/2.$$

Substituting the aforementioned values into the above conditional equation, the width D is obtained as 6.25 mm$<$D$<$8.65 mm. A glove 2 of a different size (S, M, L, XL, or the like) may be prepared on a basis of this thought.

Figure 4:
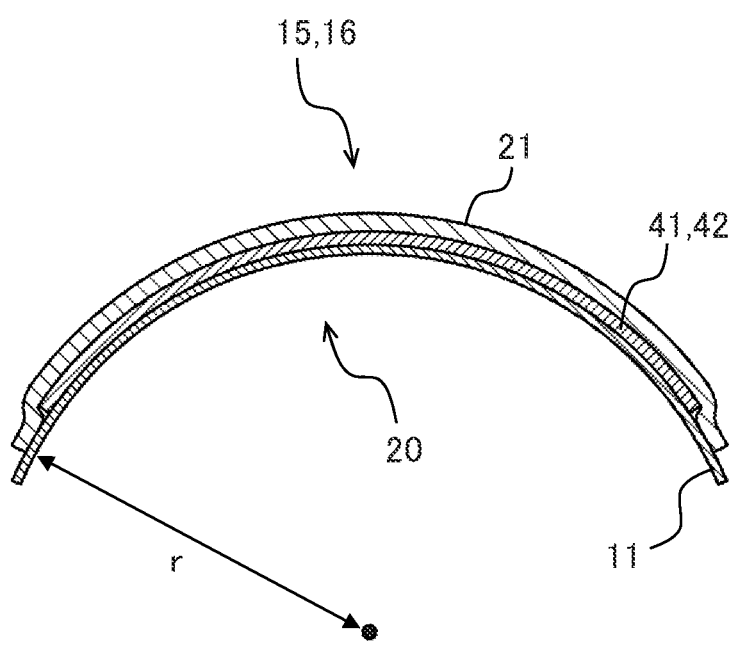
FIG. 4 is a cross-sectional view of the pressure sensor device.

FIG. 4 is a cross-sectional view of the pressure sensor device according to the embodiment.

As shown in FIG. 4, a pressure-sensitive material 21 is provided above the comb-teeth shape electrodes 41 and 42. This pressure-sensitive material 21 has a characteristic that its resistance value varies depending on a load applied on it and is formed in a shape of a rectangular sheet. The pressure-sensitive material 21 is piled up so that it contacts metal surfaces of the comb-teeth shape electrodes 41 and 42. The pressure-sensitive material 21 is, for example, an elastic material such as rubber having an insulating property mixed with carbon resin.

Further, the pressure sensor 20 is configured so that the flexible substrate base material 11, the comb-teeth shape electrodes 41 and 42, and the pressure-sensitive material 21 have a curvature in the static state of the pressure sensor 20. The curvature radius r should be preferably set between 10 mm and 50 mm.

Furthermore, the pressure-sensitive material 21 is provided in a pressure-sensitive area (predetermined area) at which pressure is detected. It is desirable that a sensor configuration should be the minimum configuration required on a basis of the expected use case, because an increase in the area (number) of the pressure sensors 20 increases an amount of information detected and leads to an increase in a cost of components.

Figure 5:
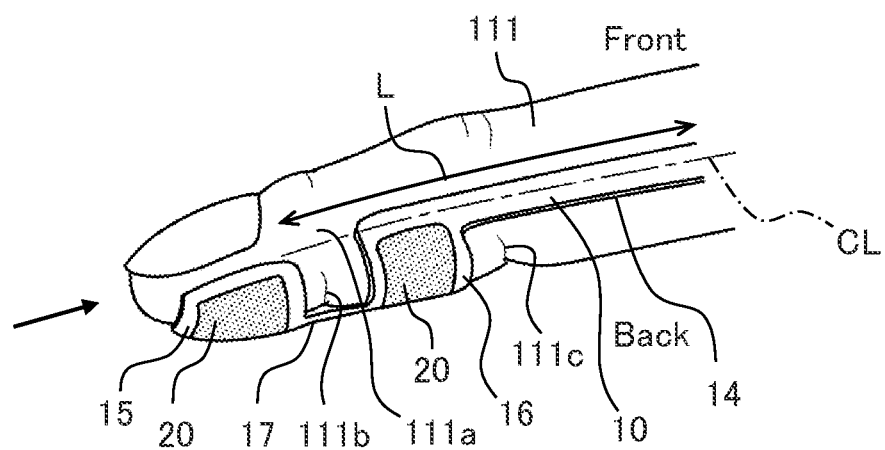
FIG. 5 is a perspective view of a state in which the pressure sensor device is attached to a finger and the finger is extended.
Figure 6:
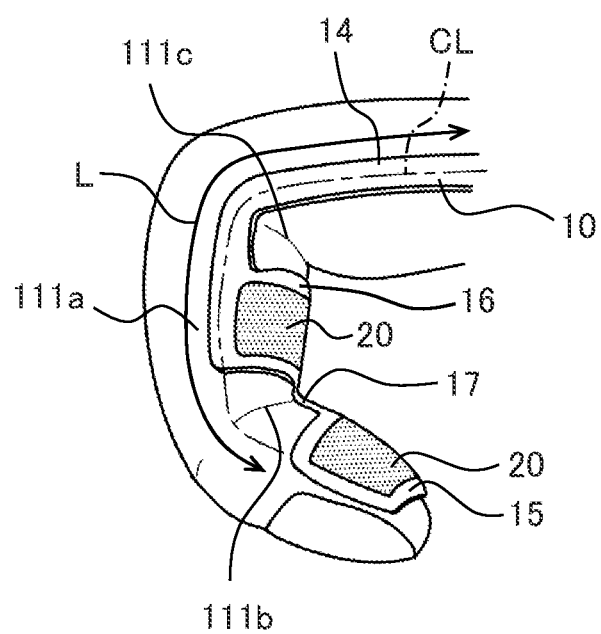
FIG. 6 is a perspective view showing a state of the fingers bent from the state shown in FIG. 5.

FIG. 5 is a perspective view of a state in which the pressure sensor device is attached to a finger and the finger is extended (the first and second joints are extended). FIG. 6 is a perspective view showing a state of the fingers bent from the state shown in FIG. 5. In an actual state, the flexible substrate 10 of the pressure sensor device 1 is attached to an inside of a glove, but for explanatory convenience, the glove is omitted from FIGS. 5 and 6. In another use, the flexible substrate 10 of the pressure sensor device 1 may be used by wrapping it directly around a finger without using a glove.

As shown in FIG. 5, the pressure sensors 20 are formed at positions corresponding to the terminal segment 15 and middle segment 16 of the index finger 111, and attached to a belly of the index finger 111 in a manner of winding around the belly (about halfway around the index finger 111). The neck portion 17 is also positioned so as to overlap with the first joint 111b. The neck portion 17 is so thin and soft that it causes little discomfort to a worker when the worker bends the index finger 111. In addition, because the pressure sensor 20 is not located at the neck portion 17, the pressure sensor 20 does not react even when the index finger 111 is bent, which eliminates possibility of a false reaction.

In addition, the bridge 14 is assigned along a centerline CL of the side of the index finger 111. This center line CL corresponds to a line whose distance does not vary when the finger 111 is bent. In FIG. 4, the distance is defined as L that is a distance from the first joint 111b to a root of a base segment of the index finger 111.

As shown in FIG. 6, when the index finger 111 is bent, the neck portion 17 is curved at the first joint 111b, and the bridge 14 is curved at the second joint 111c. Even if the index finger 111 is bent at the first joint 111b and the second joint 111c, the center line CL of the side of the index finger 111a has the distance L, which distance L does not vary from that of FIG. 4.

In a hypothetical configuration, if the bridge 14 would be assigned along the front or back of the index finger 111, the flexible substrate 10 would be pulled when the index finger 111 is bent, which causes not only discomfort to a wearer of this pressure sensor device, but also a pulling load on the flexible substrate 10, which load may cause the bridge 14 to be broken or wirings placed on the flexible substrate 10 to break. However, aligning the bridge 14 with the center line CL, as this embodiment, may reduce the discomfort of the wearer and prevent the wiring from being broken because the flexible substrate 10 is not pulled even when the index finger 111 is bent FIG. 7 is an arrow view in the S direction of FIG. 5 and shows the index finger of the right hand viewed from the fingertip.

Figure 7:
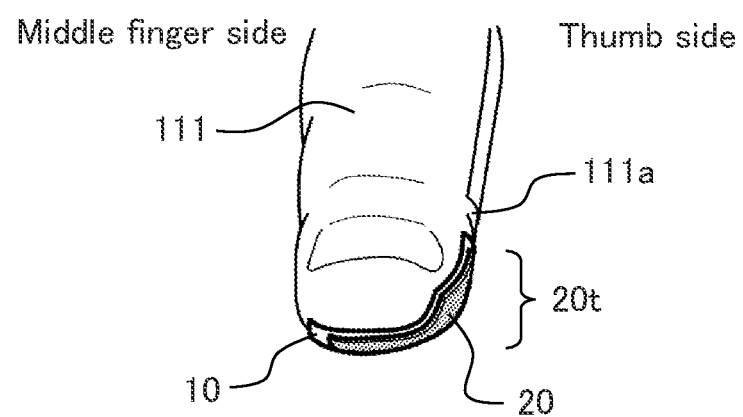
FIG. 7 is an arrow view in a S direction of FIG. 5.

As shown in FIG. 7, the flexible substrate 10 is placed in the manner of being wound around the index finger 111. The pressure sensor 20 for the index finger 111 is configured as a pressure-sensitive area 20t (load detection range) up to the side 111a of the index finger 111. This pressure-sensitive area 20t is configured so that the side near the thumb is wider than the side near the middle finger. In addition, the pressure sensor 20 is fixed inside the glove 2 (see FIG. 2) in a curved state so that it winds around the finger.

This configuration allows detecting fingertip pressure generated in a manual operation such as connector insertion, as described below in FIG. 20.

Figure 9:
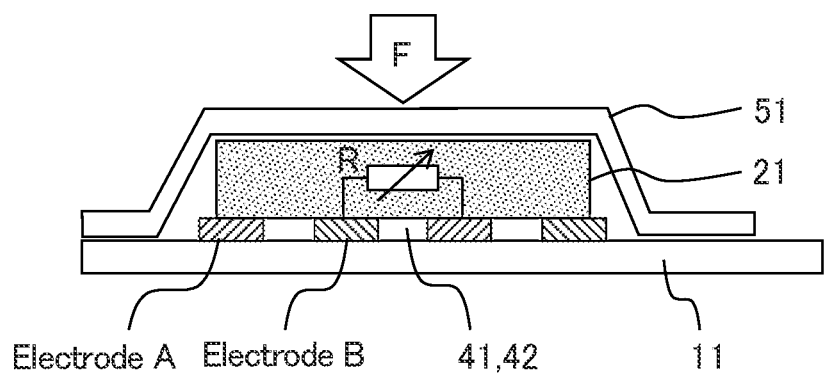
FIG. 9 is a cross-sectional schematic diagram of the pressure sensor.
Figure 10:
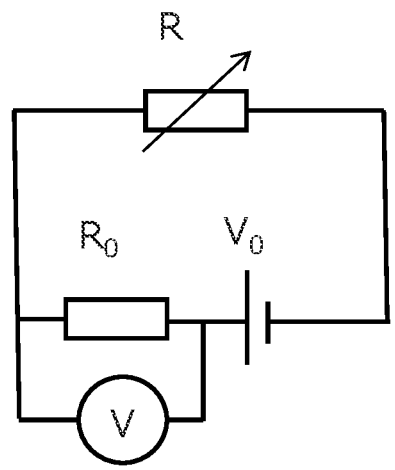
FIG. 10 is a circuit diagram of the pressure sensor.
Figure 11:
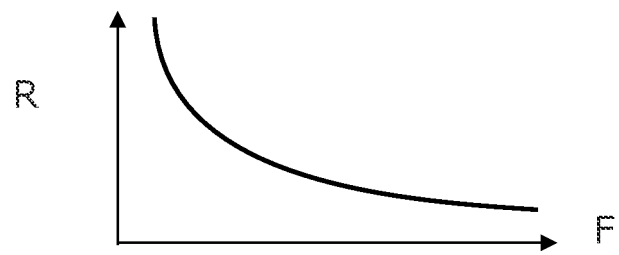
FIG. 11 is a R-F characteristics of the pressure sensor.
Figure 12:
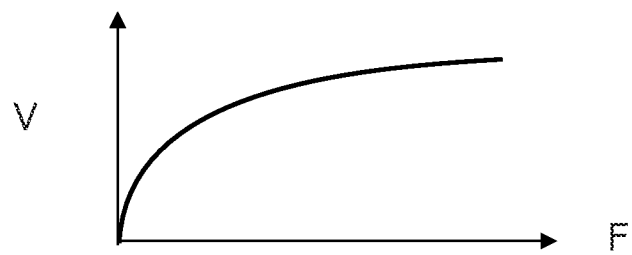
FIG. 12 is a V-F characteristics of the pressure sensor.

In the following, a principle of the pressure sensor 20 is described. FIG. 8 is a circuit diagram of a reading circuit reading a resistance of a pressure-sensitive material using a comb-teeth shape electrode. FIG. 9 is a cross-sectional schematic diagram of the pressure sensor. FIG. 10 is a circuit diagram of the pressure sensor. FIG. 11 is a R-F characteristics of the pressure sensor. FIG. 12 is a V-F characteristics of the pressure sensor.

As shown in FIG. 8, the comb-teeth shape electrodes 41 and 42 are formed on the flexible substrate base material 11 (see FIG. 9). The comb-teeth shape electrodes 41 and 42 are electrodes having shapes in which two electrodes (electrode A and electrode B) are patterned alternately. The resistance between the electrodes A and B is very high (e.g., 1 MΩ or more) because the two electrodes are electrically insulated, that is, they are patterned to be placed far enough apart so that the comb-teeth of the two electrodes do not contact each other.

As shown in FIG. 9, the pressure-sensitive material 21 is placed above the comb-teeth shape electrodes 41 and 42, and covered by a protective material 51. The protective material 51 is not limited to any particular material if they have property for protecting the pressure-sensitive material 21 and the comb-teeth shape electrodes 41 and 42, and can be, for example, a thin sheet of polyimide or the like. The pressure-sensitive material 21 has a characteristic that its resistance R is very large (e.g., more than 100 kΩ) when no load is applied and decreases (down to about 1 kΩ to 5 kΩ) when some load is applied. When a load F is applied to the pressure-sensitive material 21 placed on the comb-teeth shape electrodes 41 and 42, the resistance R drops at a local area on which the load F is applied, which results in a drop in the resistance R between the electrodes A and B.

As shown in FIG. 10, in an example of the reading circuit, the comb electrodes 41 and 42 and a load resistor R0 are connected in series and a voltage value V applied on the load resistor R0 is measured using a voltmeter. The voltage value V can be expressed by an equation shown in FIG. 10.

As shown in FIG. 11, the resistance value R varies as the load F increases. This means that the voltage value V varies with the load F as shown in FIG. 12 according to the equation shown in FIG. 10, and therefore it can function as a pressure sensor. The comb electrodes 41 and 42 can be made to function as a pressure sensor.

Figure 13A:
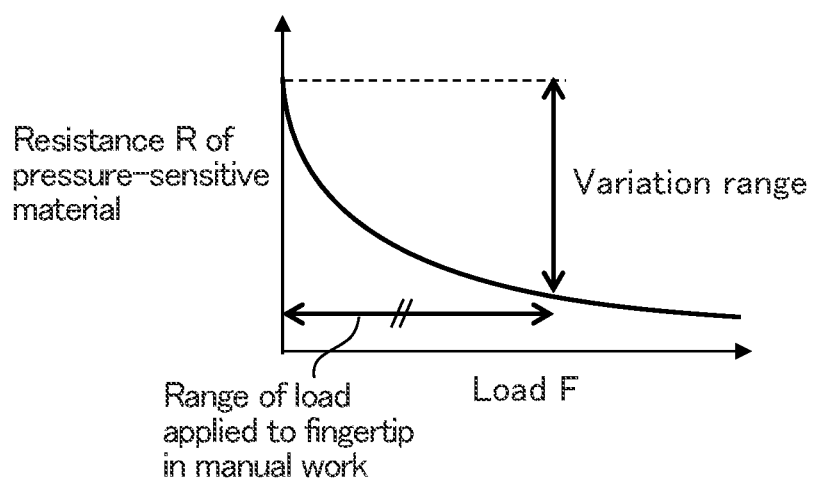
FIG. 13A is a F-R characteristics of the pressure-sensitive material without a curvature bias.
Figure 13B:
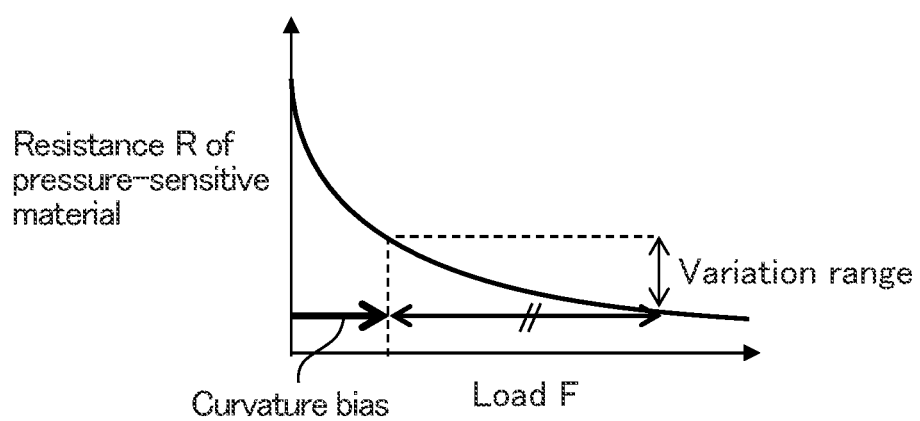
FIG. 13B is a F-R characteristics of the pressure-sensitive material with a curvature bias.

Hereinbelow, description is given of an effect of a curvature bias on a sensor output using FIGS. 13A and 13B. FIG. 13A is a F-R characteristics of the pressure-sensitive material without a curvature bias. FIG. 13B is a F-R characteristics of the pressure-sensitive material with a curvature bias.

The F-R characteristic, which is a relationship between the load F and the pressure-sensitive material resistance (resistance value of the pressure-sensitive material 21) R, depends on a composition and a production method of the pressure-sensitive material 21. For example, FIG. 13A shows a pressure-sensitive material whose pressure-sensitive material resistance R rapidly varies in a small range of the load F and gradually saturates. Because the reading circuit reads the resistance R, the range of variation in the resistance R is a dynamic range of the pressure sensor, and the larger range of variation in the resistance R is more desirable.

A range of the load applied to fingertips of a worker when performing a manual work is about 100 g to 5 kg. Therefore, selecting a pressure-sensitive material with a large variation in the resistance in the above range allows improvement of detection sensitivity of the sensor. When the pressure sensor is used in a curved state to which the sensor is transitioned from a flat state, the curvature generates an internal stress in the pressure sensor. At this time, the F-R characteristic is subjected to a curvature bias load as shown in FIG. 13B. When the curvature bias load is already applied and an additional load of 100 g to 5 kg due to a manual work is further applied on the sensor, the resistance R varies only in a significantly narrow range, which causes degradation of the detection sensitivity of the sensor. Therefore, it is important to remove the curvature bias load in order to improve the detection sensitivity of the sensor.

Figure 14A:
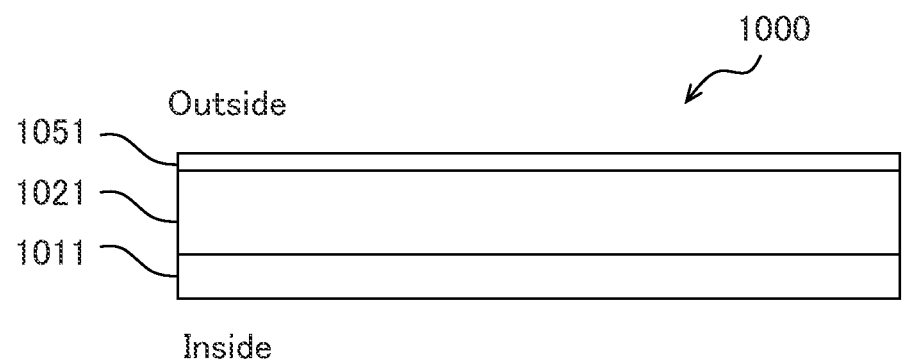
FIG. 14A is a cross-sectional view of the pressure sensor fabricated by a flat-surface assembly.
Figure 14B:
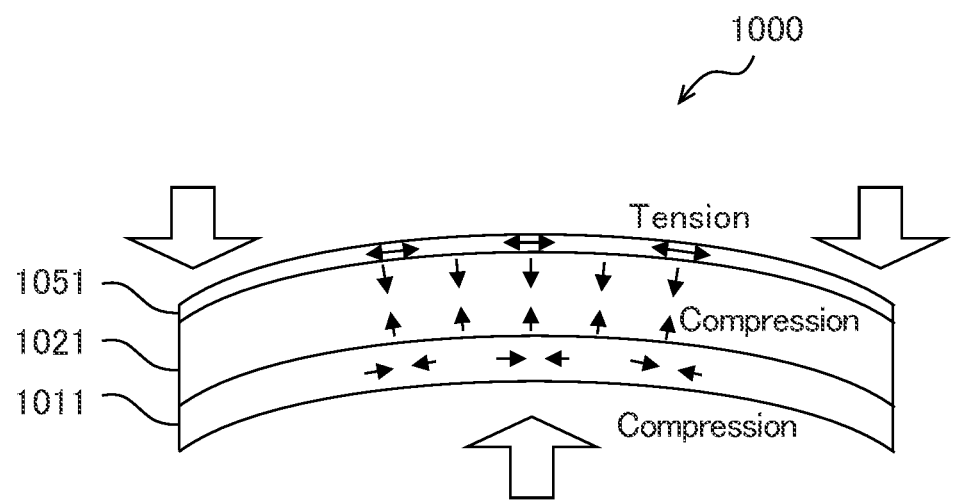
FIG. 14B is a schematic diagram showing an internal stress when the pressure sensor of FIG. 14A is curved.
Figure 15A:
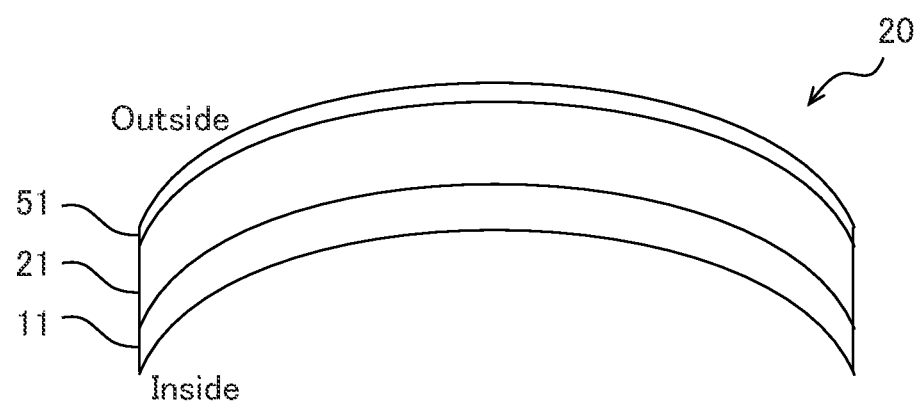
FIG. 15A is a cross-sectional view of the pressure sensor fabricated by a curved-surface assembly.
Figure 15B:
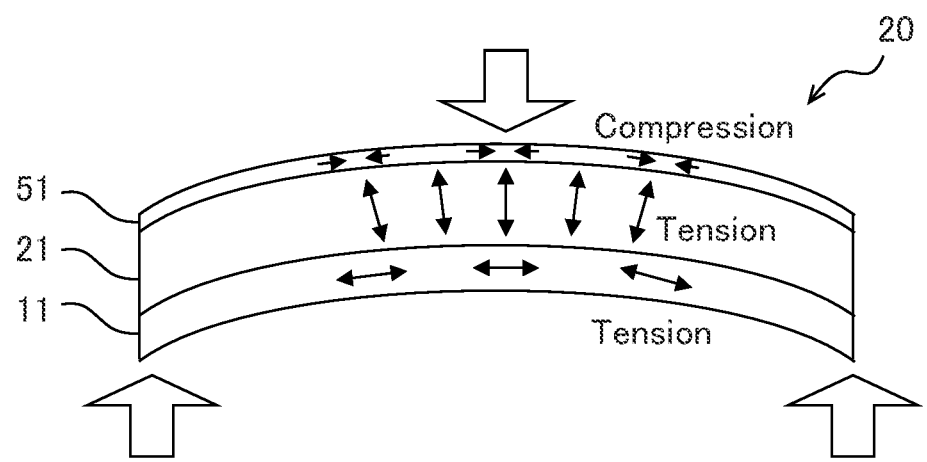
FIG. 15B is a schematic diagram showing an internal stress when a curvature of the pressure sensor of FIG. 15A is eliminated.

The next description is given of a principle of generating the curvature bias load on the pressure sensor and a structure to remove the curvature bias load. FIG. 14A is a cross-sectional view of the pressure sensor fabricated by a flat-surface assembly. FIG. 14B is a schematic diagram showing an internal stress when the pressure sensor of FIG. 14A is curved. FIG. 15A is a cross-sectional view of the pressure sensor fabricated by a curved-surface assembly. FIG. 15B is a schematic diagram showing an internal stress when a curvature of the pressure sensor of FIG. 15A is reduced. Note that FIGS. 14A, 14B, 15A, and 15B omit illustrations of the comb-teeth shape electrodes.

As shown in FIG. 14A, the pressure sensor 1000 has a laminate structure in which a flexible substrate base material 1011, a pressure-sensitive material 1021, and a protective material 1051 are laminated. The flexible substrate base material 1011 is an inside surface and the protective material 1051 is an outside surface. Hereinbelow, the structure to remove the curvature bias load is explained.

In the laminate structure (flat-surface assembly) shown in FIG. 14A, the pressure-sensitive material 1021 and the protective material 1051 are mounted on the flexible substrate base material 1011 that is in a flat state. This pressure sensor 1000 is an elastic material that does not have curvature in its static state, but when curved, generates a force to return into the flat state.

In the laminate structure (curved-surface assembly) shown in FIG. 15A, the pressure-sensitive material 21 and the protective material 51 are mounted on the flexible substrate base material 11 that is in a curved state. The pressure sensor 20 of this case generates in a static state a force returning the shape of the sensor 20 to a flat surface and a force maintaining the curved shape. The magnitude of the force returning the shape to the flat surface depends on a combination of rigidities of the flexible substrate base material 11, pressure-sensitive material 21, and protective material 51. However, a combination of the two forces stabilizes the shape in a slightly flatter state (this state is called "stable curvature"). This results in the pressure sensor 20 having a curvature corresponding to the stable curvature in the static state. This pressure sensor 20 is an elastic body that exerts a force to return the state of the sensor 20 to the stable curvature when the sensor 20 is curved.

FIG. 14B shows with solid arrows the internal stress applied on the pressure sensor 1000 when it is curved so that it is wound around a fingertip. FIG. 15B shows with solid arrows the internal stress applied on the pressure sensor 20 when it is curved so that it is wound around the fingertip.

As shown in FIG. 14B, when the pressure sensor 1000 is curved, a compressive stress is generated in the flexible substrate base material 1011 that is the inside surface, and a tensile stress is generated in the protective material 1051 that is the outside surface. This causes the pressure-sensitive material 1021 that is placed intermediate to generate a compressive stress generated in the directions perpendicular to the inside and outside surfaces. This stress in the perpendicular directions is called an interlaminar stress. The interlaminar stress due to the compression is the cause of the curvature bias load.

As shown in FIG. 15B, when the curvature is eliminated for the pressure sensor 20, which has the curvature (the curvature along the circular cross section of the finger (finger belly)) in the static state, the tensile stress is generated in the flexible substrate base material 11 that is the inside surface, and the compressive stress in the protective material 51 that is the outside surface. This results in the tensile interlaminar stress generated in the intermediate pressure-sensitive material 21. This tensile interlaminar stress corresponds to a negative load being applied to the pressure-sensitive material 21. This means that the pressure sensor 20, which has the curvature in its static state as shown in FIG. 15A, has the curvature bias load eliminated by eliminating the curvature.

On a base of the above-described thought, assuming a curvature radius r for using the sensor by wrapping it around a fingertip, and mounting the pressure-sensitive material 21 with a curvature radius even more curved than the curvature radius r, allows not only preventing a curvature bias load from being generated, but also eliminating the curvature bias load.

Figure 16:
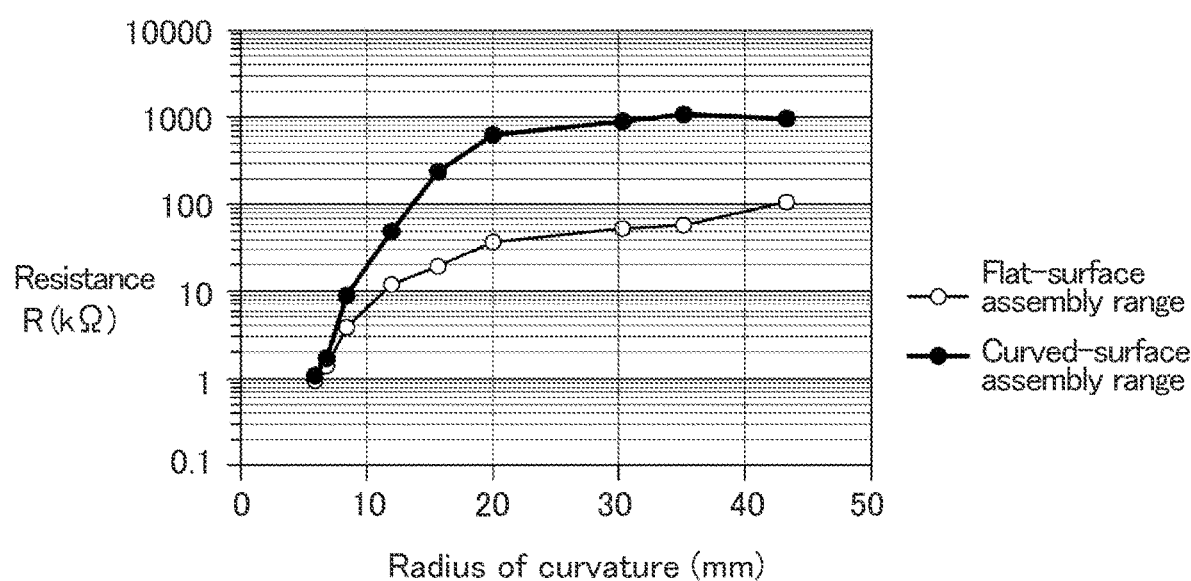
FIG. 16 is curvature characteristics of the pressure sensors fabricated by a flat-surface assembly and a curved-surface assembly.

FIG. 16 is curvature characteristics of the pressure sensors fabricated by a flat-surface assembly and a curved-surface assembly. Note that FIG. 16 shows a case of the flat-surface assembly using the graph connecting the white circles, and a case of curved-surface assembly using the graph connecting the black circles. The pressure sensor 20 made by the curved-surface assembly was fabricated using a cylindrical jig 60 (jig with a curved surface, see FIG. 17) having a curvature radius of 20 mm. The resistance R of the pressure-sensitive material 21 was measured by wrapping and fixing each pressure sensor 20 around an object with a predetermined curvature radius. At this time, no load was applied from the outside of the surface of the pressure sensor 20. The manufacturing method of the pressure sensor 20 is described below.

The pressure sensor 20 shows a behavior in which its resistance value R decreases when a load is applied, and therefore the larger resistance value R is desirable because, the larger resistance value R causes the range of variation in the resistance value R to be wider and the detection sensitivity to be higher. As shown in FIG. 16, when the curvature radius of the pressure sensor is small, that is, the pressure sensor is wrapped around an object having a smaller curvature radius or a thinner object, the curvature bias load causes both of the pressure sensors made by either the flat-surface assembly and the curved-surface assembly to be small in the resistance values R and to be narrow in the sensor operating ranges. In another viewpoint, the pressure sensor 20 of the curved-surface assembly shows the large resistance value R of 500 kΩ or more in the area where the curvature radius is 20 mm or more, which indicates that a wide sensor operating range can be kept. In addition, the pressure sensor of the curved-surface assembly shows the larger resistance value R than that of the flat-surface assembly over all curvature radii. This result shows that a negative load is applied so that the curvature bias is removed when the curved state in the static state of the curved pressure sensor 20 is eliminated (i.e., widened) as shown in FIG. 15B. Based on the above study, it is considered that the curvature bias can be effectively removed by adding the curvature in a static state by using a cylindrical jig 60 having a curvature radius smaller than a curvature radius when the pressure sensor 20 is used (curvature radius when wound around the finger).

Figure 17:
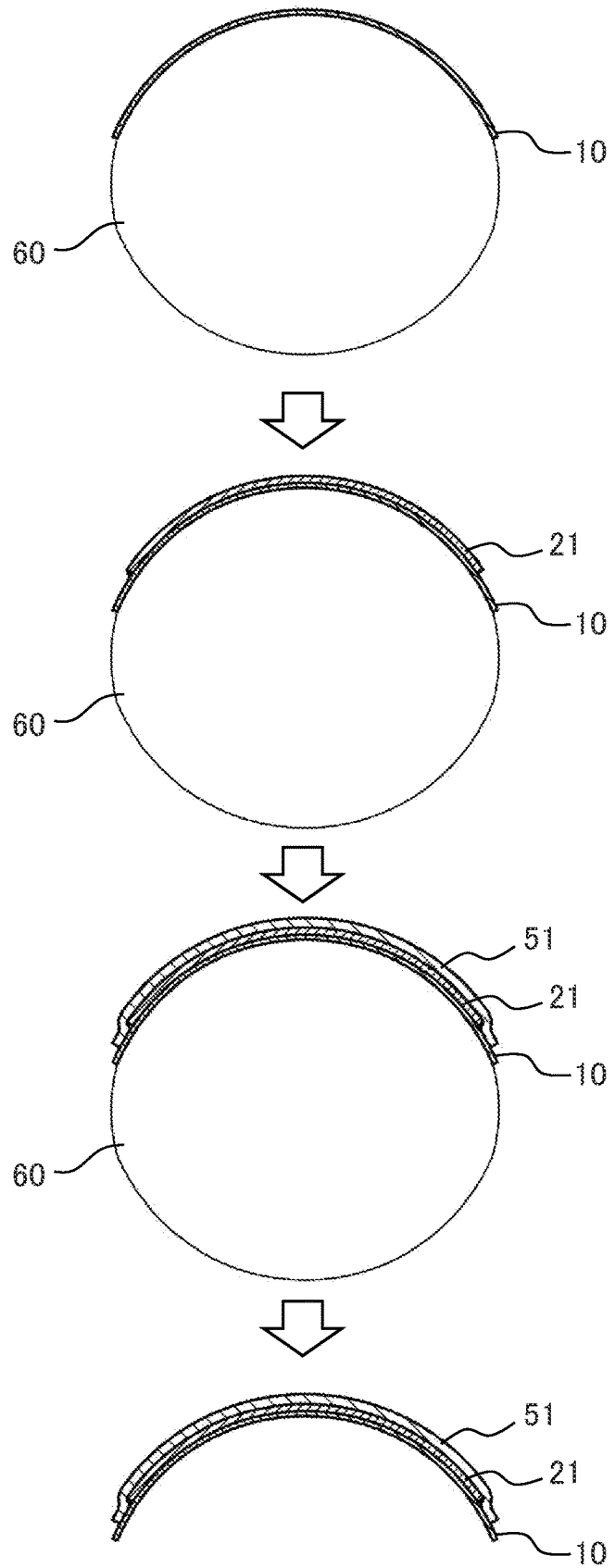
FIG. 17 is a process diagram showing a manufacturing method of the pressure sensor device.

FIG. 17 is a process diagram showing a manufacturing method of the pressure sensor device.

First, as shown in the first figure from the top of FIG. 17, the flexible substrate 10 (the flexible substrate base material 11 plus the comb-teeth shape electrodes 41 and 42) is fixed to the cylindrical jig 60 with a double-sided tape and the like. The comb-teeth shape electrodes 41 and 42 of the flexible substrate 10 are facing outward. The above step keeps the flexible substrate 10 in a curved state (state with curvature). Then, as shown in the second figure from the top in FIG. 17, the pressure-sensitive material 21 (pressure-sensitive sheet) is placed and sticked on the comb-teeth shape electrodes 41 and 42 of the flexible substrate 10 kept in the curved state. This ensures the pressure-sensitive material 21 also to be kept in a curved state (a state with the curvature). Then, as shown in the third figure from the top in FIG. 17, the protective material 51 (protective sheet) is sticked on the pressure-sensitive material 21 that is still in the curved state. The protective material 51 consists mainly of, for example, a polyimide tape. Then, as shown in the fourth figure from the top of FIG. 17, the sheet-like material that includes the pressure-sensitive material 21 and the protective material 51 laminated on the flexible substrate 10 is removed from the cylindrical jig 60. This results in the pressure sensor 20 (pressure sensor device 1) having the curvature in the static state.

The above-mentioned manufacturing method of the pressure sensor 20 (pressure sensor device) is only one example and is not limited to this embodiment. For example, the following is another manufacturing method of the pressure sensor 20: pouring ink containing carbon particles (flowable elastic resin) onto the comb-teeth shape electrodes 41 and 42 on the curved flexible substrate 10; and molding the pressure-sensitive material 21 by heating. This method allows a productivity of the pressure sensor 20 to be improved comparing with the manual manufacturing method described above.

Figure 18:
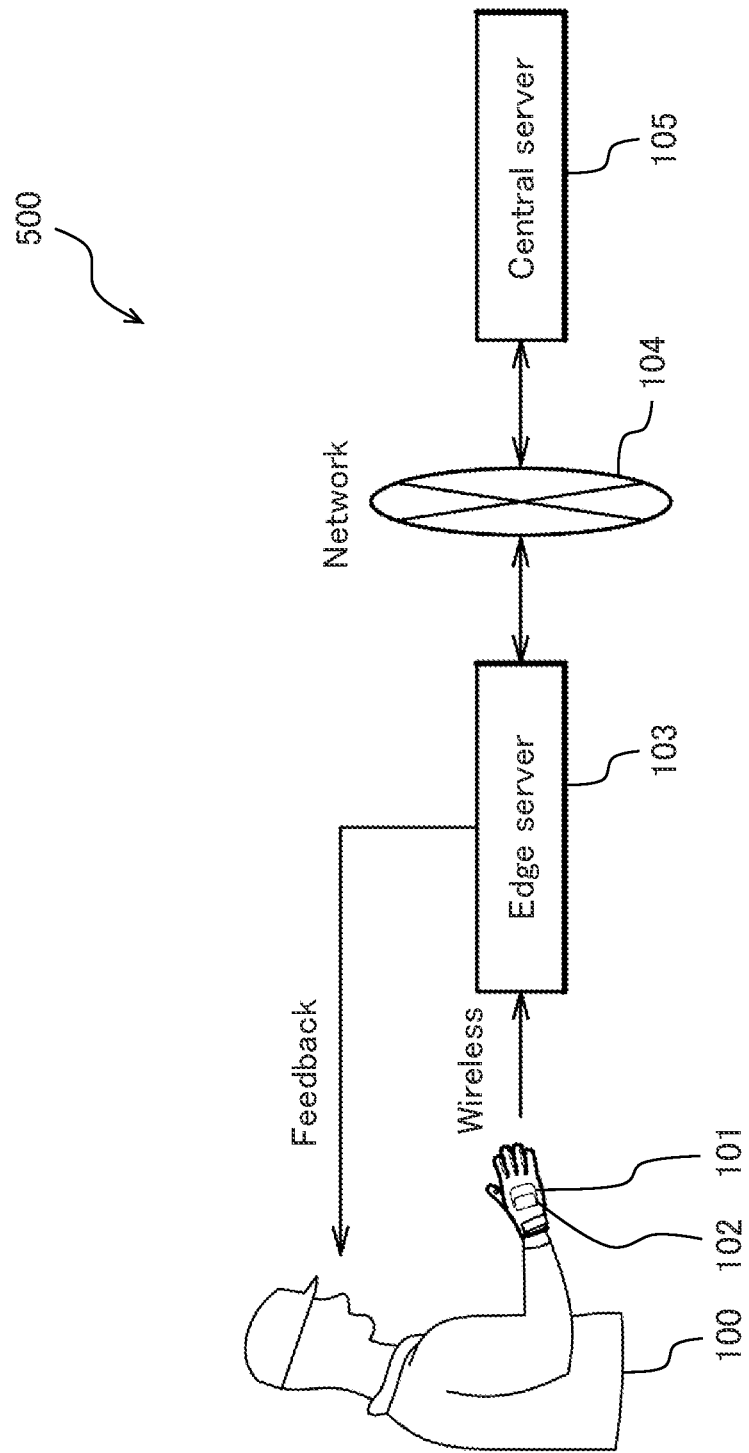
FIG. 18 is a configuration diagram of a work management system managing a work performed by a worker.

FIG. 18 is a configuration diagram of a work management system managing a work performed by a worker As shown in FIG. 18, the work management system 500 includes a sensor built-in glove 101 (a pressure sensor device), and an edge server 103 (status manager and controller) that performs status management on a basis of a voltage value V transmitted from a transmitter 102 provided in the sensor built-in glove 101. The transmitter 102 transmits the voltage value V measured by the sensor built-in glove 101.

The sensor built-in glove 101 includes: the flexible substrate base material 11 (see FIG. 9); the comb-teeth shape electrodes 41 and 42 (see FIG. 9) with exposed metal surfaces formed on a predetermined area on the flexible substrate base material 11; the pressure-sensitive material 21 (see FIG. 9) that is provided above the comb-teeth shape electrodes 41 and 42, varies in the resistance value R depending on the load, and has the curvature in the static state; and the transmitter 102.

A worker 100 wears the sensor built-in glove 101 to perform a manual work. The manual work includes assembly, equipment inspection, work using a tool, checking, and the like.

The sensor built-in glove includes the pressure sensor 20 that detects a pressure applied to the fingertip, an acceleration sensor 32 and a gyroscopic sensor 34 that detect movement of the hand, and a microphone 33 that detects work sounds produced by the fingertip.

Sensor data detected by the sensors incorporated in the glove 101 (pressure sensor 20, acceleration sensor 32, microphone 33, gyroscopic sensor 34) is transmitted through a wireless channel of the transmitter 102 to the edge server 103 that is the status manager. The channel for transmitting the sensor data is not limited to be wireless, but may also be wired. The edge server 103 is an electronic device equipped with a CPU, such as a PC or a smartphone.

The edge server 103 performs arithmetic operation on the sensor data and provides feedback to the worker, as necessary. The feedback includes, for example, alerting the worker with a patrol lamp, and the like, when the edge server 103 determines that the worker is performing dangerous work. In one of other cases, for example, if a behavior of the assembly worker deviates from a normal behavior, the server 103 alerts the worker to redo the assembly in order to improve a quality of an assembled product.

The edge server 103 transmits data through a network 104 to a central server 105. The edge server 103 performs functions of storing sensor data and collaborating with other systems. Note that the arithmetic operation on the sensor data may be performed by either the edge server 103 or the central server 105. In addition, the edge server 103 and the central server 105 may be the same device. The edge server 103 and the central server 105 may also communicate directly with each other via wired or wireless means without intermediation through the network 104.

Figure 19:
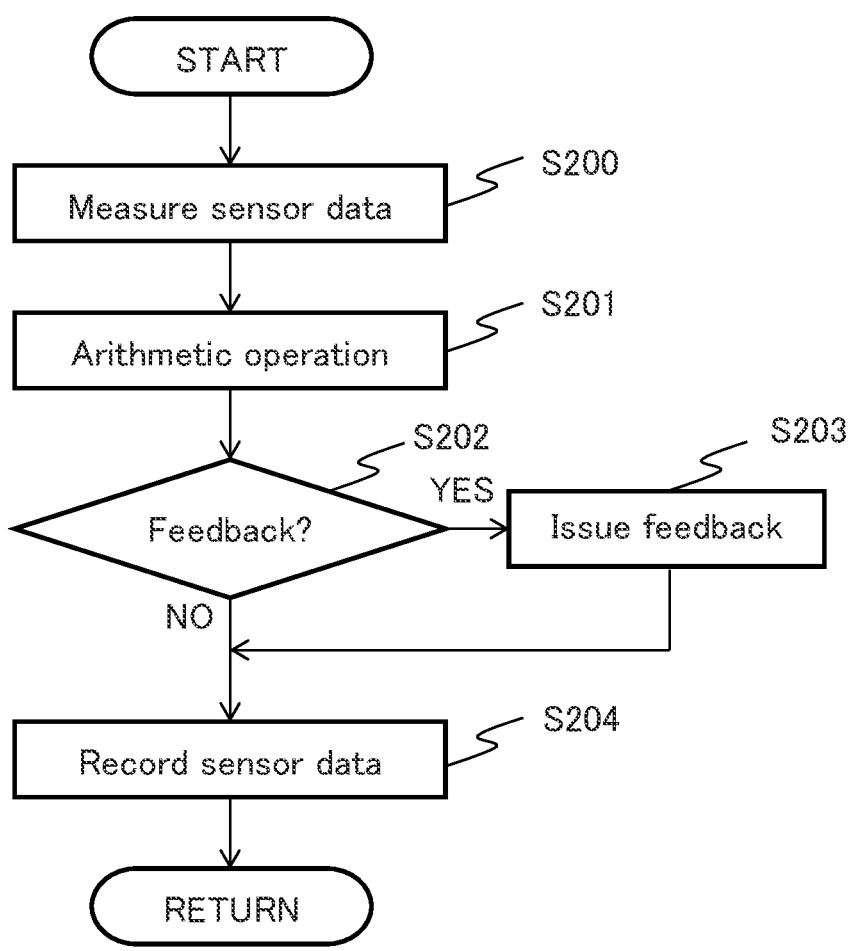
FIG. 19 is a flowchart showing an operation of the work management system.

FIG. 19 is a flowchart showing an operation of the work management system.

As shown in FIG. 19, first in step S200, sensor data from the sensors incorporated in the sensor built-in glove 101 (see FIG. 18) is measured. The measurement of the sensor data is repeated at a specified sampling interval (e.g., every one second, every 0.01 second, or the like). Alternatively, the measurement may be triggered by an external input to the system that the worker has performed a series of tasks. For example, the system detects movements of the worker 100 using a camera and measures the sensor data on a timing when detecting an end of the work from video image.

In step S201, the edge server 103 (or the central server 105) performs arithmetic operation on the sensor data. The arithmetic operation includes resampling, digital filtering, noise removal, calculation of statistical values (such as mean, variance, standard deviation, and the like), spectrum calculation, pattern matching, regression analysis, and classification generalized as machine learning (such as support vector machine, logistic regression, random forest, k-nearest neighbor algorithm, etc.).

In step S202, the edge server 103 determines whether or not feedback to the worker is necessary in view of a result of the calculation. If the edge server 103 determines that the feedback is necessary for the worker 100 (S202, YES), it proceeds to step S203 to issue the feedback to the worker 100. If the edge server 103 determines that the feedback is unnecessary for the worker 100 (S202, NO), it proceeds to step S204 to record the sensor data. The edge server 103 also proceeds to step S204 to record the sensor data even after issuing the feedback to the worker (S203). In this way, the edge server 103 (or the central server 105) records the sensor data regardless of whether or not the feedback is issued (S204).

In order to avoid a huge amount of recorded sensor data, it is assumed that only some sensor data is recorded. For example, when it is determined that feedback is necessary, the sensor data is of high importance because the worker may be performing non-regular behavior such as a dangerous manual work. Recording only the sensor data when it is determined that the feedback is necessary is an effective way to reduce the amount of the recorded sensor data.

Hereinbelow, an example of utilizing the work management system 500 is described with reference to the drawings.

Figure 20:
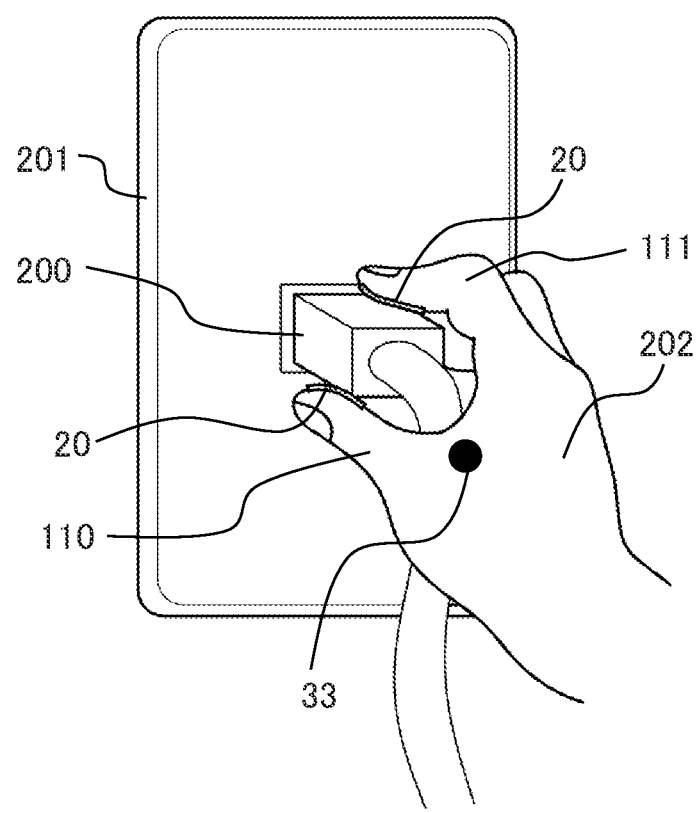
FIG. 20 is a perspective view of an example of a connector insertion work.

FIG. 20 is a perspective view of an example of a connector insertion work. For convenience of explanation, FIG. 20 shows a state of the glove being removed.

As shown in FIG. 20, the connector insertion work is a work of inserting the connector 200 into the insertion target 201. If the connector is not properly inserted, the connector 200 may have faulty electrical contact, or the connector may come off due to vibration. Further, in a case in which the insertion target 201 is an automobile, if the connector 200 is disconnected after the product is shipped, it may lead to an accident. As described above, it is important to the work of inserting the connector to ensure a quality of the connector-inserted state.

However, the connector insertion work is difficult to automate with robots, and is often performed manually by an assembly worker. This system (work management system) can be effectively utilized to ensure the quality of the connector insertion work that is manually performed.

The pressure sensor device 1 applied to this system is provided with pressure sensors 20 and the microphone 33, which sensors 20 are assigned at tips of the thumb 110 and the index finger 111 of the worker's hand 202 for grasping the connector 200. The pressure sensors 20 detect that the worker has grabbed the connector 200. The microphone 33 detects the interlocking sound emitted when the connector 200 is inserted into the insertion target 201. In addition, the pressure sensor 20 is positioned at a location opposite the terminal segment 15 of the thumb 110 and locations opposite the terminal segment 15 and middle segment 16 of the index finger 111.

Analyzing the sensor data obtained from the pressure sensor 20 and the microphone 33 allows determination on whether or not the connector insertion work has been properly performed. If the connector insertion work is determined to be inappropriate (YES in S202 of FIG. 19), the system can provide feedback to the worker by means of a patrol lamp (S203 in FIG. 19) to instruct him/her to redo the insertion work. In this way, the quality of the connector insertion work can be ensured.

In the work example shown in FIG. 20, description is given as an example using the pressure sensor device 1 provided with a single microphone 33. However, in addition to the microphone 33 near a drive unit, the pressure sensor device 1 may be configured to have another microphone added at a position far from the drive unit.

Figure 21A:
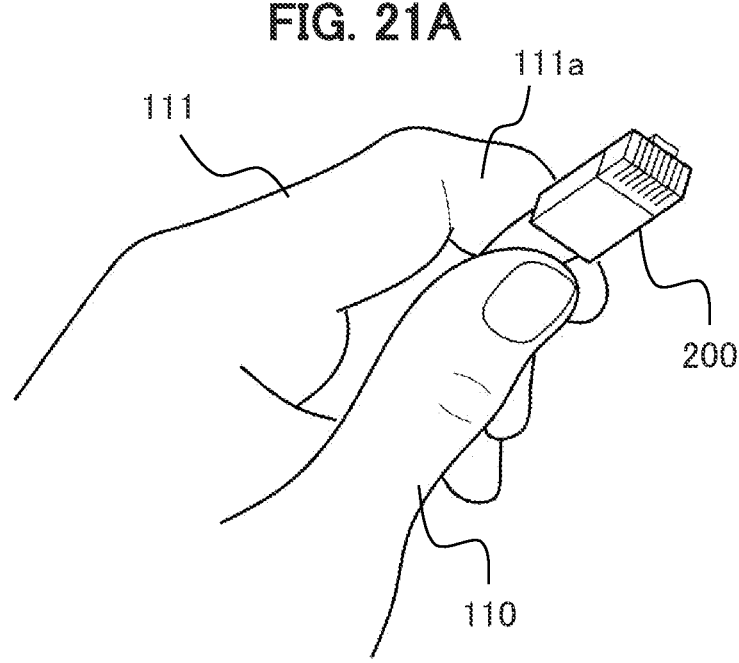
FIG. 21A is a perspective view showing a shape of a hand holding a connector.
Figure 21B:
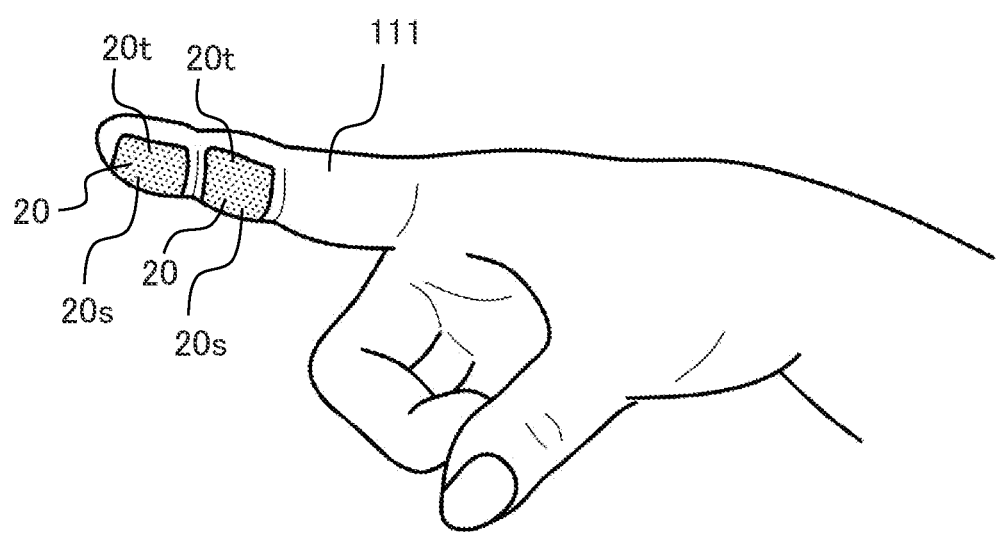
FIG. 21B is a perspective view showing a position of the finger on which the sensor is mounted.

FIG. 21A is a perspective view showing a shape of a hand holding a connector and shows an example of a shape of the hand holding a LAN cable connector 200. A way to hold the connector 200 varies from person to person. The way of holding the connector 200 shown in FIG. 21A is using the belly of the thumb 110 and the side of the index finger 111 to grasp the connector. In this way of holding, in order to detect a force of the index finger 111 when it inserts the connector 200, the pressure-sensitive area (load detection range of the pressure sensor 20) of the index finger 111 needs to cover the side 111a of the index finger 111 (see FIG. 21A) as the pressure-sensitive area 20t in addition to the pressure-sensitive area 20s on the belly of the index finger 111, as shown in FIG. 21B. In addition, including both of the terminal segment 15 and the middle segment 16 of the index finger 111 into the pressure-sensitive area allows covering various grasping ways that differ depending on personal characters.

Figure 22:
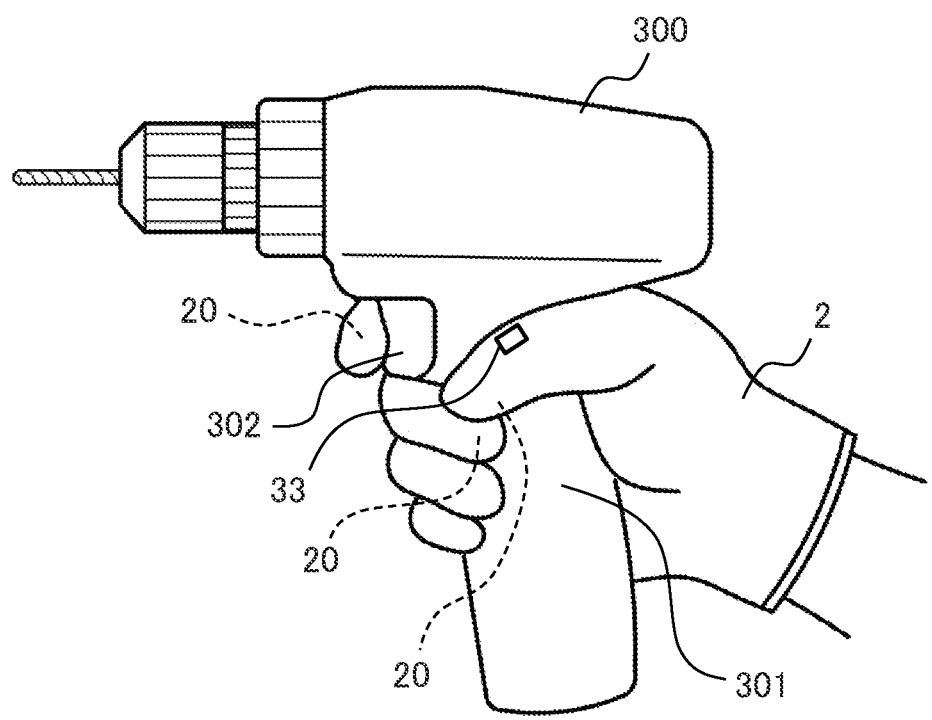
FIG. 22 is a perspective view of an example of a work using a power tool.

FIG. 22 is a perspective view of an example of a work using a power tool. Note that FIG. 22 shows an example of a work using an electric screwdriver as a usage case applying the pressure sensitive device As shown in FIG. 22, when grasping the electric screwdriver 300, the grip 301 is held by the thumb, middle finger, ring finger, and little finger, and the index finger is placed on the trigger 302. Grasping the electric screwdriver 300 in this way applies a load to the pressure sensors 20 of the terminal segment 15 of the thumb (see FIG. 1) and the pressure sensors 20 of the terminal segment 15 (see FIG. 1) and the middle segment 16 (see FIG. 1) of the middle finger. Because there are individual differences in a way of pulling the trigger 302, it is desirable to use both the terminal segment 15 and the middle segment 16 of the index finger as the pressure-sensitive areas.

When working with such an electric screwdriver 300, pulling the trigger 302 applies pressure to the index finger, which causes the pressure sensor 20 on the index finger to capture the action of pulling the trigger 302. In addition, when the trigger 302 is pulled and the driver at a tip end is rotated and driven, a driving sound is emitted and captured by the microphone 33. In this way, managing the sensor data of the pressure sensor 20 and the microphone 33 can confirm the quality of the work using the electric driver 300.

Figure 23:
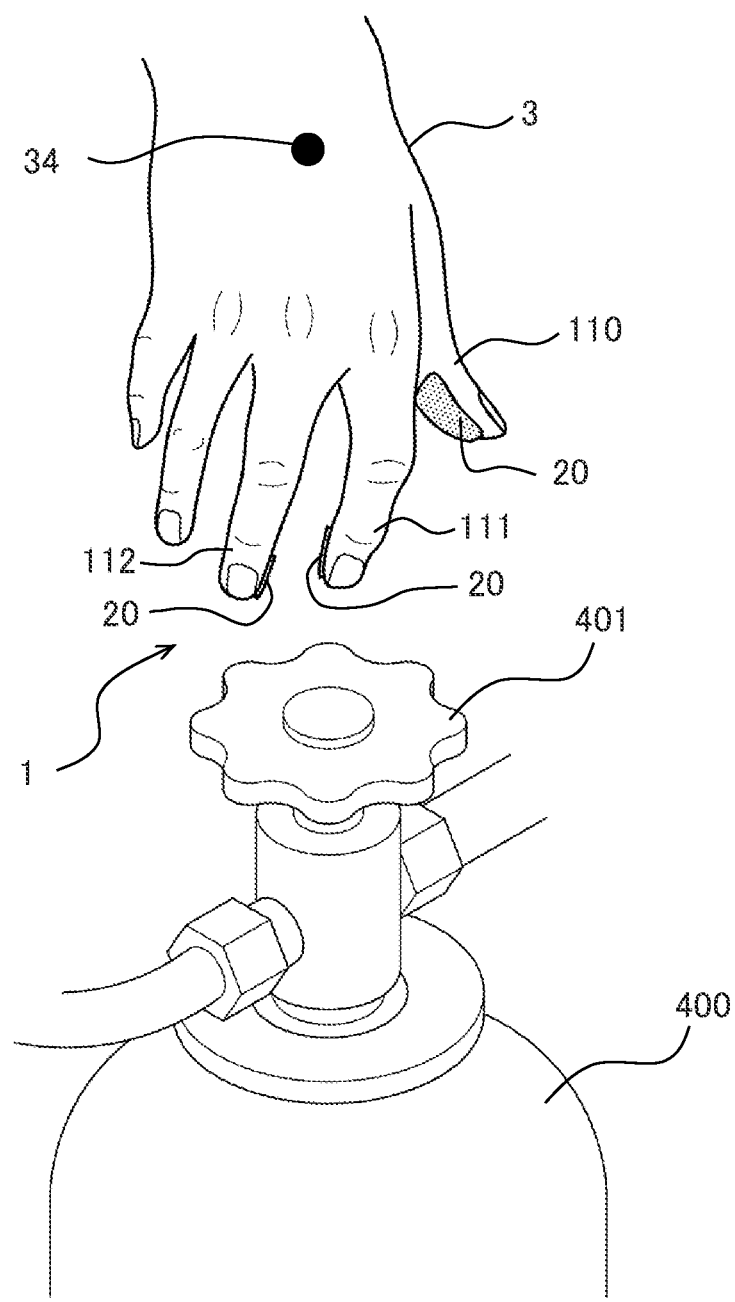
FIG. 23 is a perspective view showing an example of a work for opening/closing a valve.

FIG. 23 is a perspective view showing an example of a work for opening/closing a valve. The gloves are omitted in FIG. 23.

As shown in FIG. 23, a valve work is a process of opening and closing a valve 401 equipped in a cylinder 400. Regulating a closing level of the valve 401 adjusts a flow rate of gas and opens/closes a gas channel. The valve work is typically performed, for example, in an inspection of a plant, a semiconductor manufacturing equipment, and the like. If the valve work is not performed properly, a reverse flow of gas or mixed flow of gas may occur. The valve 401 can be replaced by a mechanical device such as a solenoid valve, but valves to be manually opened and closed are also widely used.

This system (work management system) can be utilized to keep a work record of the worker's proper performance in the valve work. This system includes the pressure sensors 20 of the thumb 110, the index finger 111, and the middle finger 112, which sensors 20 detect the force of the fingers grasping the valve 401, and a gyroscopic sensor 34 that detects a rotational motion of the hand 3, A sequence of operations for closing the valve 401 is as follows. First, the valve 401 is grasped and rotated by hand. Once the valve 401 is closed to some extent, it is stopped rotating. More force is applied in a direction of rotation (in a direction of the valve 401 closing). Further force is applied in the direction in which the valve 401 is closed to confirm that the valve 401 is completely closed (confirmation work).

Using this system allows the gyroscopic sensor 34 to detect the rotation of the hand 3, and the pressure sensor 20 to detect the action of applying force with the fingers in the confirmation work. In this way, the record of the work performed to close the valve 401 can be stored. The strength of the force applied in the confirmation work with the fingers is difficult to quantify using the conventional art. However, using this system allows the strength of the force to be quantified as the sensor data of the pressure sensors 20. This way allows tacit knowledge in a work field to be visualized.

As explained above, the pressure sensor device 1 of this embodiment includes the flexible substrate base material 11 having flexibility, the comb-teeth shape electrodes 41 and 42 that have exposed metal surfaces formed in a predetermined area on the flexible substrate base material 11, and the pressure-sensitive material 21 that is provided on the comb-teeth shape electrodes 41 and 42 and has the resistance value R varying with the load and the curvature in the static state. This makes it possible to reduce or eliminate the curvature bias to improve the detection sensitivity and to mitigate a degree of a false detection.

In this embodiment, the pressure sensor device 1 is fixed to the inside of the glove. This enables stably holding the pressure sensor device 1 and easily attaching and removing the pressure sensor device 1. In addition, because the pressure sensor device 1 does not directly contact an object, the pressure sensor device 1 can be suppressed from being deteriorated.

In this embodiment, the flexible substrate base material 11 is equipped with the connection part 11b connecting with the microphone 33, the connection part 11a connecting with the acceleration sensor 32, and the connector 31 connecting with the wireless transmitter module 4. According to this configuration, equipping the microphone 33 allows minute work sounds near a hand to be captured. Further, equipping the acceleration sensor 32 allows capturing the movement of a hand and other objects. Thus, integrally using multiple types of sensors enables capturing more detailed information on the manual work. Furthermore, equipping the wireless transmitter module 4 allows easily transmitting the detected sensor data (information) such as the detected pressure to the computing processor of the edge server 103 and the like. In addition, the wireless transmitter module 4 is able to improve usability of the system compared to the wired system.

In this embodiment, the sides of the terminal segment 15 and the middle segment 16 of the index finger 111 are pressure-sensitive areas 20t as predetermined areas (see FIGS. 7, 20, 21A, and 21B). This allows the connector insertion work to be properly managed.

In this embodiment, the flexible substrate base material 11 is fixed to the glove 2 so that the bridge 14 of the base material 11 extending from the finger to the back of the hand is placed on the side of the finger (see FIG. 7). This helps to alleviate discomfort when the wearer of the glove 2 bends and stretches the finger.

In this embodiment, the pressure-sensitive area 20s includes the terminal segment 15 and middle segment 16, and the flexible substrate base material 11 includes the neck portion 17 formed with a narrow width of the flexible substrate base material 11 at a position overlapping with the first joint 111b that connects the terminal segment 15 with the middle segment 16 (see FIG. 3). This alleviates a degree of a false reaction of the sensor caused by bending the fingers and also reduces the discomfort of the worker due to bending and stretching the fingers.

In this embodiment, the flexible substrate base material 11 is provided with the comb-teeth shape electrodes 41 and 42 formed asymmetrically with reference to the connection electrodes 43 that electrically connect the terminal segment 15 to the middle segment 16 (see FIG. 3). This configuration allows the side 111a of the index finger 111 to be used as the pressure-sensitive area 20*t*, making it possible to perform the connector insertion work, and the like in a suitable manner.

In this embodiment, a width D of the neck portion 17 is 6.25 mm or more and 8.65 mm or less (see FIG. 3), which allows a majority of workers to feel less discomfort when they bends and stretches the fingers.

In this embodiment, the radius of curvature r in the static state (abbreviated as "curvature radius") of the pressure-sensitive material 21 is set to 10 mm to 50 mm (see FIG. 4). Setting the curvature radius r in such a range allows the embodiment to be utilized not only for hands but also for curved surfaces of various objects such as a foot.

In this embodiment, the pressure-sensitive material 21 is attached on the finger in a state in which the curvature radius r in its static state is further smaller than the curvature radius of the fingertip (curved surface of a target on which the pressure-sensitive material 21 is attached). This configuration not only prevents the curvature bias load from being generated, but also removes the curvature bias load to obtain a highly sensitive pressure sensor device 1.

In addition, the work management system 500 of this embodiment includes the pressure sensor device 1 including the flexible substrate base material 11 having flexibility, the comb-teeth shape electrodes 41 and 42 that are formed in a predetermined area on the flexible substrate base material 11 and have exposed metal surfaces, and the pressure-sensitive material 21 that is provided on the comb-teeth shape electrodes 41 and 42, and has the resistance value R varying with the load and the curvature in the static state; and the edge server 103 (or the central server 105) that performs status management based on the voltage value V transmitted by the wireless transmitter module 4. This configuration allows the manual work in the factory assembly processes, equipment inspection work, and the like to be digitized with sensors and the work management system 500 to be applied for recording work histories, preventing work errors, and extracting proficient skills.

In the work management system 500, the edge server 103 (or the central server 105) provides a feedback on a work status according to the result of the status management, and performs a warning process based on the feedback (see S202 and S203 in FIG. 19). This configuration may prevent work errors from being overlooked.

In the manufacturing method of the pressure sensor device of this embodiment, a flexible substrate base material 11 on which comb-teeth shape electrodes 41 and 42 are formed is attached to the cylindrical jig 60 having a curved surface by wrapping the material 11 around the cylindrical jig 60. The pressure-sensitive material 21 whose resistance value varies depending on a load is formed above the comb-teeth shape electrodes 41 and 42 in the curved state. After adhering the protective material 51 over the pressure-sensitive material 21, the flexible substrate base material 11 including the comb-teeth shape electrodes 41 and 42, the pressure-sensitive material 21, and the protective material 51 is removed from the cylindrical jig 60. According to this method, a pressure sensor device with improved detection sensitivity and excellent capability of mitigating a degree of a false reaction can be manufactured in a simple process.

Note that the present invention is not limited to the aforementioned embodiments and may include various modifications. For example, in this embodiment, description is given of a case in which the pressure sensor device 1 is mounted on the glove 2. However, the pressure sensor device may be applied to a sock. Specifically, the pressure sensor device can be applied to a testing of a brake in a manufacturing process of automobiles, and configured to use a base of a toe as the pressure-sensitive area.

Figure 24:
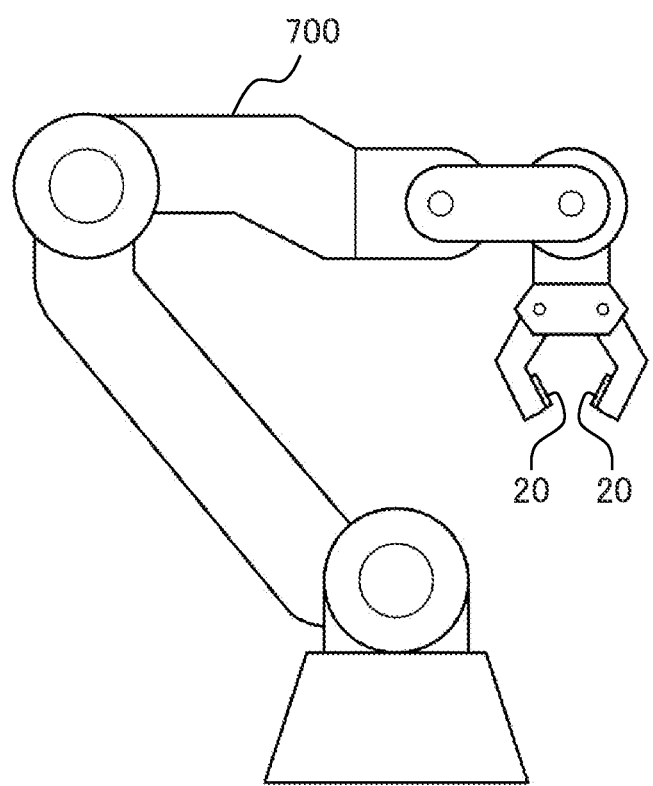
FIG. 24 is a schematic diagram of a case in which the pressure sensor device supplied to a robot arm.

Further, the pressure sensor device can also be applied to a robot arm 700 instead of the human hand. As shown in FIG. 24, pressure sensor devices with the pressure sensors 20 are fixed to two finger parts provided in the robot arm 700. Applying the pressure sensor device to a robot in this way enables various types of work management to be done for various lots of works. In addition, this embodiment can be configured at a lower cost than equipping the pressure sensor on the robot itself.

Another embodiment includes a flexible substrate base material 11 shaped to follow a hand, comb-teeth shape electrodes 41 and 42 with exposed metal surface formed in the pressure-sensitive area on the flexible substrate base material 11, and the pressure-sensitive material 21 that is provided on the comb electrodes 41 and 42 and has the resistance value R varying with a load. The pressure-sensitive area includes areas overlapping the terminal segment 15 and middle segment 16 of a finger. In the flexible substrate base material 11, the first joint 111*b* connecting the terminal segment 15 with the middle segment 16 is provided with the neck portion (necked shape) 17 at which the width D of the flexible substrate base material 11 is narrow. This configuration is able to eliminate discomfort caused to a worker when the finger is bent.

Also, in this embodiment, description is given as an example of a case in which the pressure sensor 20 is mounted on the thumb 110, index finger 111, and middle finger 112. However, the pressure sensor 20 may be mounted on two fingers of the thumb 110 and index finger 111 or on four or more fingers.

This embodiment is described using as an example the pressure sensor device 1 with the curvature to follow along the cross-section of a finger being cut into a circle. However, this embodiment is not limited to such a configuration. For example, because a finger is curved so as to taper from its first joint 111*b* toward its fingertip, the pressure sensor device may be configured to have a curvature in a static state following along the tapering. This configuration is able to reduce or eliminate the curvature bias to improve the detection sensitivity and to mitigate the degree of the false detection.

In addition, this embodiment is described as an example using the case in which the pressure sensor device 1 is fixed to a glove. However, the pressure sensor device 1 may be fixed directly to the worker's hand.

REFERENCE SIGNS LIST

1: Pressure sensor device
2: Glove
2*a*: Fingertip
2*b*: Pocket
3: Worker's hand
4: Wireless transmitter module (transmitter)
10: Flexible substrate
11: Flexible substrate base material
11*a*, 11*b*: Connection part
12: back part
13: Fingertip
14: Bridge
15: Terminal segment
16: Middle segment
17: Neck portion (necked shape)
20: Pressure sensor
20*s*, 20*t*: Pressure-sensitive area (predetermined area)

21: Pressure-sensitive material
31: Connector (connection part)
32: Acceleration sensor
33: Microphone
34: Gyro sensor
40: Electrode
41, 42: Comb-teeth shape electrode
43: Connection electrode (connection wiring)
51: Protective material
60: Cylindrical jig (jig with curved surface)
100: Worker
110: Thumb
111: Index finger
111a: Side of index finger
111b: First joint of index finger
111c: Second joint of index finger
112: Middle finger
101: Gloves with built-in sensor (pressure sensor
102: Transmitter
103: Edge server (status manager)
104: Network
105: Central server
200: Connector
201: Insertion target
202: Worker's hands
203: Pressure-sensitive area
300: Electric driver
301: Grips
302: Triggers
400: Cylinder
401: Valve
500: Work management system
CL: Center line
r: Curvature radius
R: Resistance

The invention claimed is:

1. A pressure sensor device mounted on a target for detecting pressure, the pressure sensor device comprising:
a flexible substrate base material having flexibility;
an electrode having an exposed metal surface and formed in a predetermined area on the flexible substrate base material; and
a pressure sensor including a pressure-sensitive material that is provided on the electrode and configured to vary in a resistance value thereof depending on an amount of a load,
wherein the pressure sensor including the pressure-sensitive material is configured to be curved and then laminated so as to have a curvature in a static state, and
wherein a radius of a curvature of the pressure sensor device in the static state is smaller than a radius of a curvature of a curved surface of the target, the curvature of the pressure sensor device increasing the resistance value of the pressure-sensitive material for at least one of: reducing a curvature bias load on the pressure sensor, increasing a sensitivity of the pressure sensor, or reducing a degree of false detection.

2. The pressure sensor device according to claim 1, wherein
the target is a glove and the pressure sensor device is configured to be mounted on an inside of the glove.

3. The pressure sensor device according to claim 2, wherein
the flexible substrate base material is configured to be fixed to the glove so that a bridge extending from a finger to a back of a hand, when inside the glove, is disposed on a side of the finger.

4. The pressure sensor device according to claim 1, wherein
the flexible substrate base material is equipped with a connection part configured to connect the pressure sensor device with at least one of a microphone, an acceleration sensor, and a transmitter.

5. The pressure sensor device according to claim 1, wherein
the predetermined area on the flexible substrate base material includes a first pressure sensitive area for corresponding to a terminal segment of a finger and a second pressure sensitive area for corresponding to a middle segment of the finger.

6. The pressure sensor device according to claim 5, wherein
the first pressure-sensitive area is configured for overlapping the terminal segment of the finger and the second pressure-sensitive area is configured for overlapping the middle segment of the finger, and
the flexible substrate base material is configured to include a neck portion between the first and second pressure-sensitive areas, and at which a width of the flexible substrate base material is formed to be narrowed at a position for overlapping a joint of the finger connecting the terminal segment with the middle segment of the finger.

7. The pressure sensor device according to claim 6, wherein
the flexible substrate base material is formed so that the electrode is right-left asymmetrical with reference to a connection wiring that is configured to electrically connect between portions of the flexible substrate base material corresponding to the terminal segment and the middle segment.

8. The pressure sensor device according to claim 6, wherein
the width of the neck portion is 6.25 mm or more and 8.65 mm or less.

9. The pressure sensor device according to claim 8, wherein
the radius of the curvature of the pressure sensor device in the static state is 10 mm to 50 mm.

10. A work management system comprising:
a pressure sensor device mounted on a target, the pressure sensor device including:
a flexible substrate base material having flexibility;
an electrode configured to have an exposed metal surface formed in a predetermined area on the flexible substrate base material;
a pressure sensor including a pressure-sensitive material that is provided on the electrode and configured to vary in a resistance value thereof depending on an amount of a load; and
a transmitter that transmits at least a voltage value measured by the pressure-sensitive material; and
a status manager configured to perform status management on a basis of the voltage value transmitted from the transmitter,
wherein the pressure sensor including the pressure-sensitive material is configured to be curved and then laminated so as to have a curvature in a static state, and
wherein a radius of a curvature of the pressure sensor device in the static state is smaller than a radius of a curvature of a curved surface of the target, the curvature of the pressure sensor device increasing the resistance value of the pressure-sensitive material for at least one of: reducing a curvature bias load on the pressure sensor, increasing a sensitivity of the pressure sensor, or reducing a degree of false detection.

11. The work management system according to claim 10, wherein the status manager is configured to perform a feedback about a work state according to a result of the status management; and to perform a warning based on the feedback.

\* \* \* \* \*